J. SCHÜTTE.
BALLOON SYSTEM FOR AIRSHIPS.
APPLICATION FILED JULY 2, 1909.
1,001,995.                                    Patented Aug. 29, 1911.
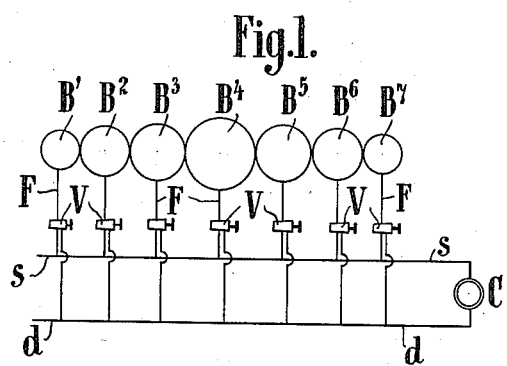
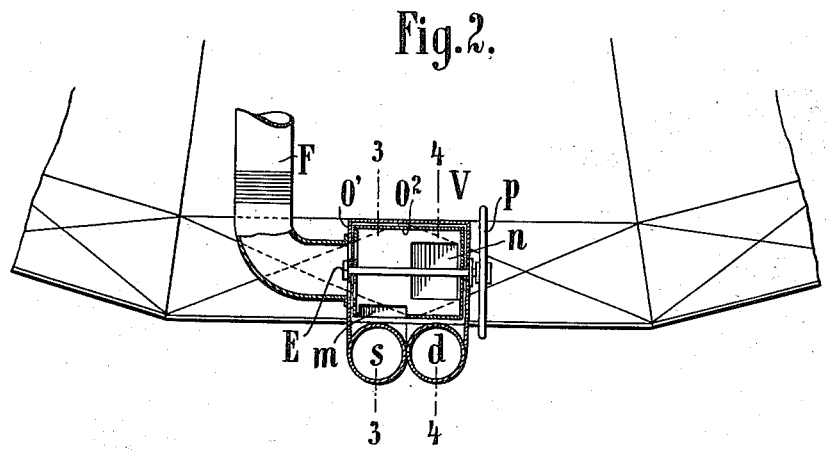
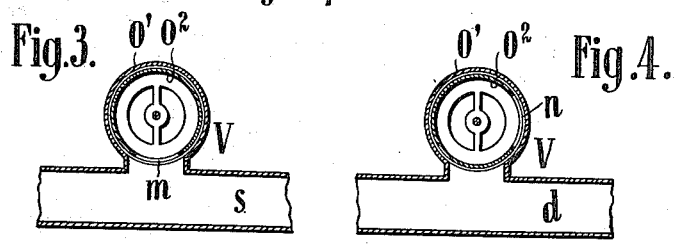

UNITED STATES PATENT OFFICE.

JOHANN SCHÜTTE, OF LANGFUHR, NEAR DANZIG, GERMANY.

BALLOON SYSTEM FOR AIRSHIPS.

1,001,995.  Specification of Letters Patent.  Patented Aug. 29, 1911.

Application filed July 2, 1909. Serial No. 505,693.

*To all whom it may concern:*

Be it known that I, JOHANN SCHÜTTE, a subject of the King of Prussia, residing at 47$^b$ Jäschkenthalerweg, Langfuhr, near Danzig, Germany, have invented certain new and useful Improvements in Balloon Systems for Airships; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specificattion.

My invention relates to balloon systems for air-ships, and has for its object to provide a plurality of independent, inflatable elements, preferably, but not necessarily, spherical, with means to permit the simultaneous or independent inflation of these elements by reason of connecting them to suction and force conduits, and also to permit the gas pipes of said elements to be interconnected, together with details of structure to be hereinafter described and particularly pointed out in the claim.

Referring to the drawings, in which like parts are similarly designated—Figure 1 is a diagrammatic elevation embodying my invention. Fig. 2 is a transverse section through the suction and forcing conduit, showing the controlling valve for a single inflatable element in vertical section. Fig. 3 is a section taken on the line 3—3 of Fig. 2. Fig. 4 is a section taken on the line 4—4 of Fig. 2.

In Fig. 1 I have shown a number of inflatable elements B' . . . B$^7$, each of which is connected by an inflating tube F to a valve V, and each valve controls the communication of tube F with a suction conduit $s$ and also controls the communication with a compression or forcing conduit $d$. These two conduits $s$ and $d$ are connected to a pump, fan, or the like C. The valves V control the connection of the pipes or flexible tubes F to the pipes or tubes $s$ and $d$ connected respectively to the pressure and suction sides of the pump C so that one or more of the inflatable elements may be supplied with gas, or the gas pressure therein reduced, as may be desired. Such a structure also permits gas to be taken from one inflatable element and pumped into one or all of the other inflatable elements, thereby permitting the equilibrium of the balloon as a unit, or the air-ship to be maintained in case of leakage of any one of the inflatable elements, with the consequent beneficial result of maintaining the air-ship or balloon trim in case of accident to one of the inflatable elements, and permit the normal working of its screws and motor.

By connecting the suction conduit to a gas holder all the inflatable elements may be simultaneously inflated or supplied with gas.

The pipe F is connected to the inflatable elements at its upper end, and at its lower end is connected to a valve casing O'. Within the valve casing O' is a hollow cylindrical valve O$^2$, open at one end where it communicates with the tube F, and said valve O$^2$ is mounted on a valve spindle E operated by a hand wheel $p$. The valve O$^2$ is provided with two ports $m$ and $n$ capable of registering respectively with the suction and pressure conduits $s$ and $d$. These ports are angularly displaced, being preferably, but not necessarily, 90° apart, so that when the port $m$ registers with the suction conduit $s$ the port $n$ is out of register with its pressure conduit $d$, as shown in Figs. 3 and 4.

Instead of having a single valve for controlling the connection of the inflatable element with the suction and the pressure conduits, it is, of course obvious that independent valves may be used.

I claim—

In an air-ship, a plurality of spherical, inflatable elements, in combination with two conduits and a pump connecting the ends of said conduits, one of which conduits is connected to the suction side of the pump and the other to the pressure side of said pump, and a valve having two ports between said conduits and each inflatable element, whereby said element may be connected with either the suction or pressure conduit.

In testimony that I claim the foregoing as my invention, I have signed my name in presence of two subscribing witnesses.

JOHANN SCHÜTTE.

Witnesses:
 PROF. ZUHNEY,
 KARL WALTHER.